United States Patent
Nakano et al.

(10) Patent No.: US 12,263,832 B2
(45) Date of Patent: Apr. 1, 2025

(54) CONTROLLER FOR HYBRID ELECTRIC VEHICLE AND METHOD FOR CONTROLLING HYBRID ELECTRIC VEHICLE

(71) Applicant: TOYOTA JIDOSHA KABUSHIKI KAISHA, Toyota (JP)

(72) Inventors: Tomohiro Nakano, Nagoya (JP); Shinichi Oda, Susono (JP); Masanao Idogawa, Nagoya (JP); Koji Ichikawa, Aichi-gun (JP); Atsushi Fukuda, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 241 days.

(21) Appl. No.: 18/159,763

(22) Filed: Jan. 26, 2023

(65) Prior Publication Data

US 2023/0271602 A1 Aug. 31, 2023

(30) Foreign Application Priority Data

Feb. 28, 2022 (JP) ................. 2022-029270

(51) Int. Cl.
  *B60W 20/40* (2016.01)
  *B60K 6/40* (2007.10)
  (Continued)

(52) U.S. Cl.
  CPC ............ *B60W 20/40* (2013.01); *B60K 6/40* (2013.01); *B60W 10/02* (2013.01); *B60W 10/06* (2013.01);
  (Continued)

(58) Field of Classification Search
  CPC .... B60K 6/40; B60K 6/48; B60K 2006/4825; B60W 10/02; B60W 10/06; B60W 10/08; B60W 20/00; B60W 20/15; B60W 20/16; B60W 20/40; B60W 30/18063; B60W 30/186; B60W 2510/0208; B60W 2510/0291; B60W 2510/0638; B60W 2510/0676; B60W 2510/081; B60W 2510/244; B60W 2520/10;
  (Continued)

(56) References Cited

U.S. PATENT DOCUMENTS

2009/0143189 A1* 6/2009 Hasegawa ............. B60W 10/02
  903/946
2009/0143950 A1* 6/2009 Hasegawa ............. B60W 10/08
  701/68

FOREIGN PATENT DOCUMENTS

| JP | 9-30294 A | 2/1997 |
| JP | 2011-25858 A | 2/2011 |
| JP | 2020-111276 A | 7/2020 |

* cited by examiner

*Primary Examiner* — Peter D Nolan
*Assistant Examiner* — Ce Li Li
(74) *Attorney, Agent, or Firm* — Oblon, McClelland, Maier & Neustadt, L.L.P.

(57) ABSTRACT

A controller controls a hybrid electric vehicle. The hybrid electric vehicle includes an engine, a motor arranged in a power transmission path between the engine and a drive wheel, and a clutch arranged in the power transmission path between the engine and the motor. The controller idles the engine in accordance with a target engine rotation speed and operates the motor in accordance with a target motor rotation speed when the clutch is in a disengagement state. When the clutch is in the disengagement state and the engine is idling, the target motor rotation speed is less than the target engine rotation speed.

5 Claims, 5 Drawing Sheets

(51) Int. Cl.
*B60W 10/02* (2006.01)
*B60W 10/06* (2006.01)

(52) U.S. Cl.
CPC .............. *B60W 2510/0208* (2013.01); *B60W 2510/0638* (2013.01); *B60W 2510/0676* (2013.01); *B60W 2510/081* (2013.01); *B60W 2710/021* (2013.01); *B60W 2710/0644* (2013.01); *B60Y 2200/92* (2013.01)

(58) Field of Classification Search
CPC ......... B60W 2540/10; B60W 2540/16; B60W 2552/15; B60W 2710/021; B60W 2710/025; B60W 2710/0644; B60W 2710/081; B60W 30/18027; B60Y 2200/92; Y02T 10/62; Y02T 10/64; Y02T 10/7072; Y02T 10/72
See application file for complete search history.

| Gearshift Position | Target Motor Rotation Speed | Target Engine Rotation Speed |
|---|---|---|
| D-Position | 650 | 800 |
| N-Position | 700 | |
| R-Position | 650 | |

CONTROLLER FOR HYBRID ELECTRIC VEHICLE AND METHOD FOR CONTROLLING HYBRID ELECTRIC VEHICLE

BACKGROUND

1. Field

The following description relates to a controller for a hybrid electric vehicle and a method for controlling a hybrid electric vehicle.

2. Description of Related Art

Japanese Laid-Open Patent Publication No. 2020-111276 discloses a controller for a hybrid electric vehicle. The hybrid electric vehicle includes an engine, a motor, a torque converter, and a transmission. The engine, the motor, the torque converter, and the transmission are arranged in this order.

The hybrid electric vehicle further includes a K0 clutch arranged between the engine and the motor. The K0 clutch can connect a crankshaft, which is the output shaft of the engine, to the rotor of the motor. Thus, when the K0 clutch is in an engagement state, the crankshaft and the rotor rotate integrally. When the K0 clutch is in a disengagement state, the engine rotation speed may differ from the motor rotation speed. In such a case, when the K0 clutch is shifted from the disengagement state to the engagement state, the engine rotation speed becomes equal to the motor rotation speed.

The above controller controls the engine rotation speed and the motor rotation speed at the same target rotation speed when shifting the K0 clutch from the disengagement state to the engagement state. This avoids sudden changes in the motor rotation speed when the K0 clutch is shifted from the disengagement state to the engagement state. That is, changes in driving force are minimized when the K0 clutch shifts to the engagement state.

When the K0 clutch is in the disengagement state, the engine may be idling. In such a case, the engine rotation speed may be required to be relatively high to stabilize combustion in the engine. Thus, the above controller increases the motor rotation speed. Consequently, when the controller controls the engine to stabilize combustion, the motor will consume more power.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a controller for a hybrid electric vehicle is provided. The hybrid electric vehicle includes an engine, a motor arranged in a power transmission path between the engine and a drive wheel, and a clutch arranged in the power transmission path between the engine and the motor. The controller includes processing circuitry. The processing circuitry is configured to idle the engine in accordance with a target engine rotation speed and operate the motor in accordance with a target motor rotation speed when the clutch is in a disengagement state. When the clutch is in the disengagement state and the engine is idling, the target motor rotation speed is less than the target engine rotation speed.

In another general aspect, a method for controlling a hybrid electric vehicle is provided. The hybrid electric vehicle includes an engine, a motor arranged in a power transmission path between the engine and a drive wheel, and a clutch arranged in the power transmission path between the engine and the motor. The method includes idling the engine in accordance with a target engine rotation speed and operating the motor in accordance with a target motor rotation speed when the clutch is in a disengagement state. When the clutch is in the disengagement state and the engine is idling, the target motor rotation speed is less than the target engine rotation speed.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A controller for a hybrid electric vehicle according to one embodiment will now be described with reference to the drawings.

Structure of Hybrid Electric Vehicle 90

Figure 1:
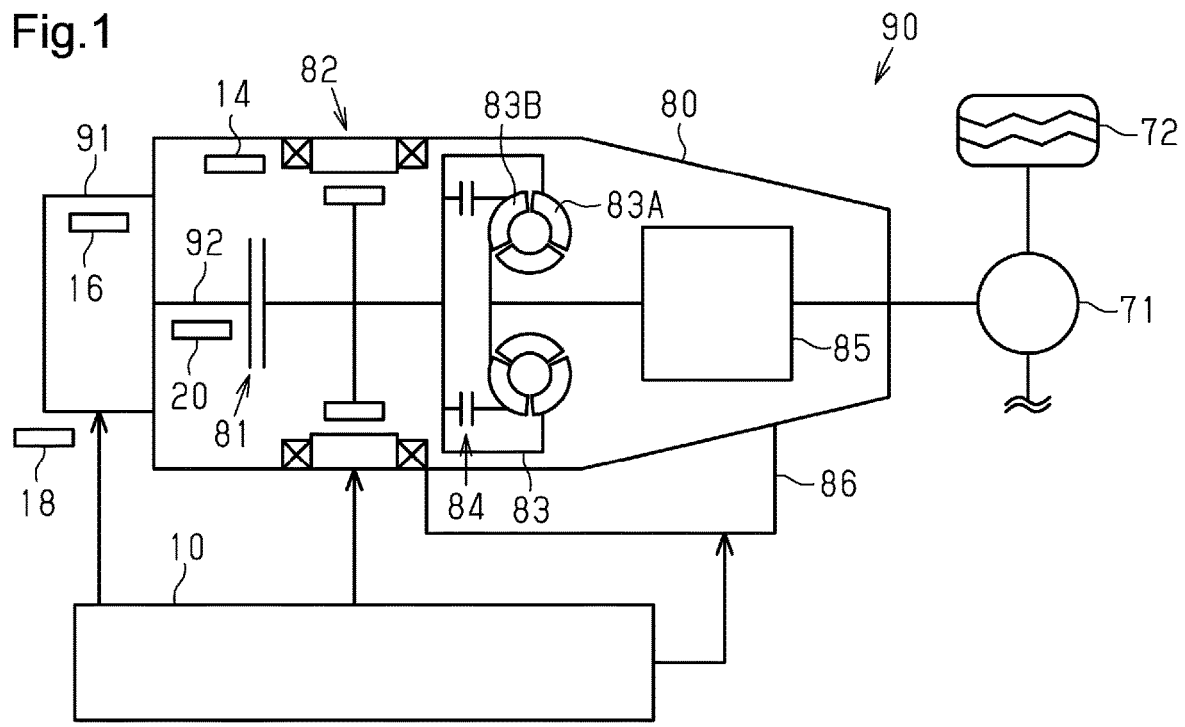
FIG. 1 is a schematic diagram of a controller for a hybrid electric vehicle according to one embodiment and the hybrid electric vehicle controlled by the controller.

FIG. 1 illustrates a controller 10 and a hybrid electric vehicle 90, hereafter referred to as vehicle 90, that is subject to control by the controller 10. The vehicle 90 includes an engine 91 and a motor 82 that serve as drive sources. The vehicle 90 includes a transmission unit 80 arranged in a power transmission path from the engine 91 to drive wheels 72. The transmission unit 80 is connected to the drive wheels 72 by a differential gear 71.

The transmission unit 80 includes the motor 82. The motor 82 is arranged in the power transmission path between the engine 91 and the drive wheels 72. The motor 82 is connected to a power supply by an inverter. The motor 82 serves as the drive source that is supplied with power from the power supply to generate driving force for the vehicle 90. The motor 82 also serves as a generator that generates power using force transmitted from the engine 91 or the drive wheels 72.

The transmission unit 80 includes a K0 clutch 81. The K0 clutch 81 is arranged in the power transmission path between the engine 91 and the motor 82. The K0 clutch 81 is operated with hydraulic pressure supplied from a hydraulic pressure control mechanism 86 included in the transmission unit 80. When the K0 clutch 81 is in an engagement state in which the K0 clutch 81 is engaged, a crankshaft 92 of the engine 91, which serves as an output shaft, is connected to the rotor of the motor 82. When the K0 clutch 81 is in a disengagement state in which the K0 clutch 81 is disengaged, the crankshaft 92 is disconnected from the rotor of the motor 82.

The transmission unit 80 includes a torque converter 83 and an automatic transmission 85. The automatic transmission 85 is closer to the drive wheels 72 than the motor 82 in the power transmission path. The automatic transmission 85 is connected to the motor 82 by the torque converter 83.

The torque converter 83 includes a pump impeller 83A at the input side and a turbine liner 83B at the output side. The pump impeller 83A is rotated integrally with an input shaft to which force from the engine 91 and the motor 82 is input. The turbine liner 83B is rotated integrally with an output shaft connected to the automatic transmission 85. The torque converter 83 transmits torque through a fluid between the pump impeller 83A and the turbine liner 83B.

The torque converter 83 also includes a lockup clutch 84 that directly couples the pump impeller 83A to the turbine liner 83B and rotates the lockup clutch 84 and the pump impeller 83A integrally. The lockup clutch 84 is operated with hydraulic pressure supplied from the hydraulic pressure control mechanism 86. Operation states of the lockup clutch 84 include a directly-coupled state, a disengagement state, and a slipping state. In the directly-coupled state, the pump impeller 83A is directly coupled to the turbine liner 83B by the lockup clutch 84. In the disengagement state, the lockup clutch 84 is disengaged. In the slipping state, the lockup clutch 84 is slipping.

The vehicle 90 can change a traveling mode by shifting between a battery electric vehicle (BEV) traveling mode and an engine traveling mode. The BEV traveling mode uses only the motor 82 as the drive source. The engine traveling mode transmits force from the engine 91 to the drive wheels 72. The K0 clutch 81 is disengaged in the BEV traveling mode. The K0 clutch 81 is engaged in the engine traveling mode. The controller 10 of the vehicle 90 changes the traveling mode.

The controller 10 includes a microcomputer having a CPU, ROM, RAM, an input/output interface, and the like. The controller 10 processes signals in accordance with programs stored in the ROM while using the temporary storage functionality of the RAM. The controller 10 controls the engine 91, the motor 82, and the like.

The motor 82 includes a motor rotation speed sensor 14. The controller 10 obtains a motor rotation speed, which is the rotation speed of the motor 82, from the motor rotation speed sensor 14. The engine 91 includes an engine rotation speed sensor 20. The controller 10 obtains an engine rotation speed, which is the rotation speed of the engine 91, from the engine rotation speed sensor 20. The rotation speed is the number of rotations per minute. The engine 91 includes an engine coolant temperature sensor 16. The controller 10 obtains an engine coolant temperature, which is the coolant temperature of the engine 91, from the engine coolant temperature sensor 16. The engine 91 includes an intake air temperature sensor 18. The controller 10 obtains an intake air temperature, which is the temperature of the air drawn into the engine 91, from the intake air temperature sensor 18.

Process Executed by Controller 10

Idling of the engine 91 will now be described. When the engine 91 is idling, the engine 91 is not required to generate output and the engine rotation speed is fixed. In other words, the shaft torque of the engine 91 (i.e., net torque) is 0 when the engine 91 is idling. The shaft torque of the engine 91 is obtained by subtracting the torque consumed by friction in the engine 91 from the torque generated by combustion in the engine 91. In other words, the shaft torque of the engine 91 is the torque output from the engine 91. When the K0 clutch 81 is disengaged and the shaft torque of the engine 91 is 0, the engine rotation speed remains fixed. When the K0 clutch 81 is disengaged and the shaft torque of the engine 91 is negative, the engine rotation speed decreases. When the K0 clutch 81 is disengaged and the shaft torque of the engine 91 is positive, the engine rotation speed increases. The engine 91 may also be idling when the K0 clutch 81 is in the engagement state.

Figure 2:
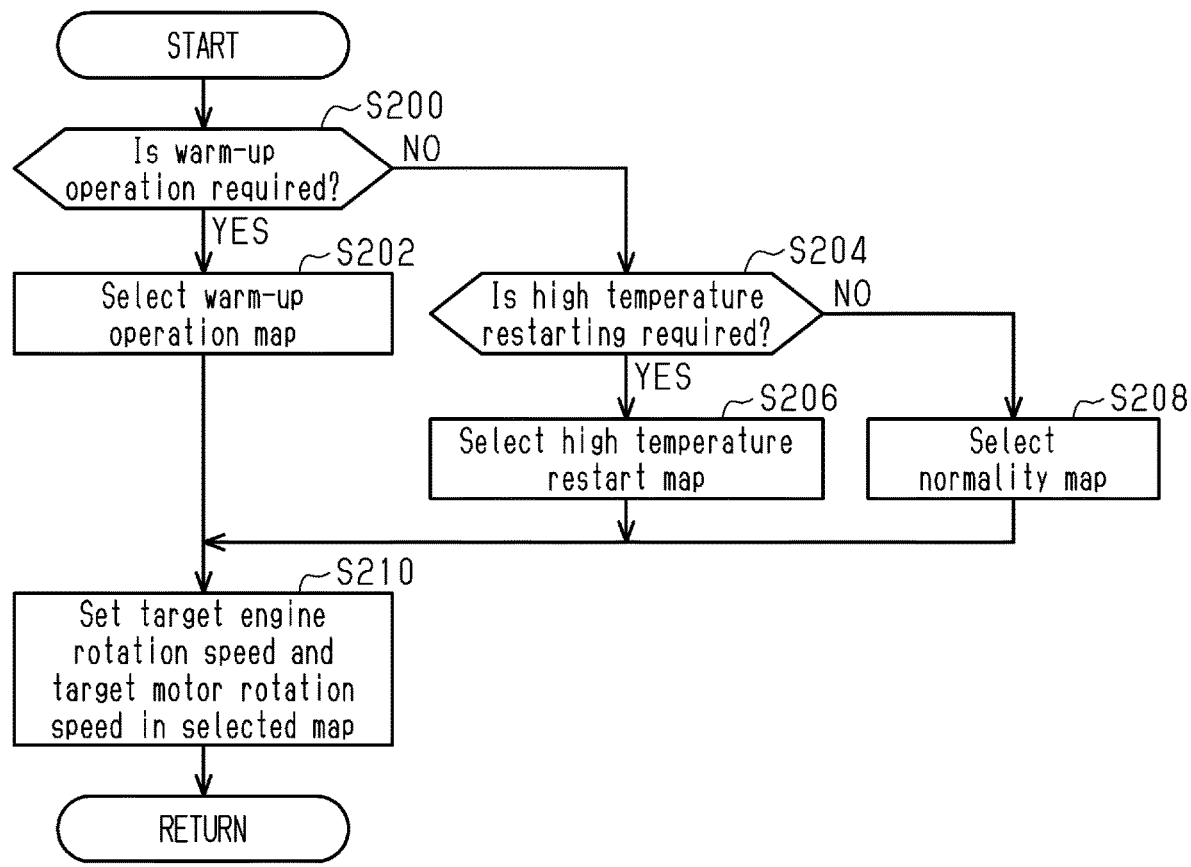
FIG. 2 is a flowchart showing a process that selects a normality map, a warm-up operation map, or a high temperature restart map when a K0 clutch is in a disengagement state.

As shown in FIG. 2, when the K0 clutch 81 is in the disengagement state, the controller 10 selects a normality map, a warm-up operation map, or a high temperature restart map. The maps specify a target engine rotation speed and a target motor rotation speed. The controller 10 idles the engine 91 and operates the motor 82 in accordance with the selected map. The normality map, the warm-up operation map, and the high temperature restart map will be described below with reference to FIGS. 3 to 5. When the K0 clutch 81 is disengaged, the controller 10 controls the vehicle 90 in the BEV traveling mode using only the motor 82 as the drive source as described above.

Figure 6:
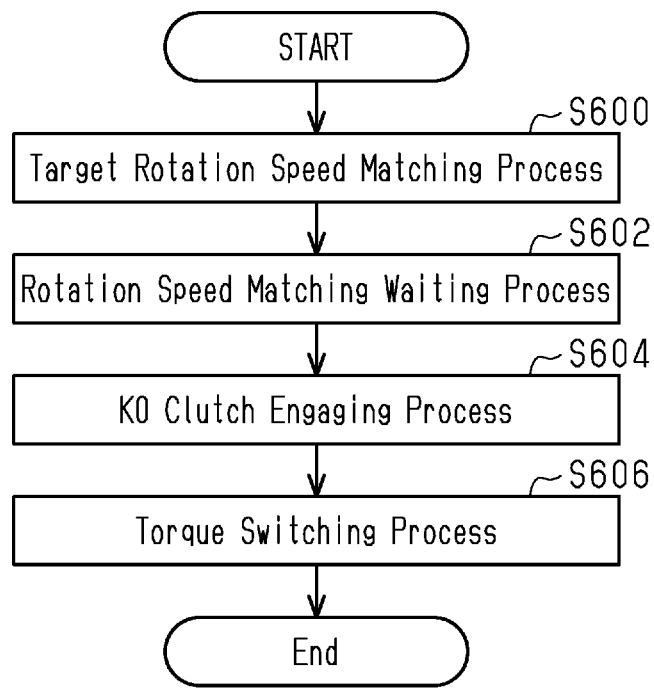
FIG. 6 is a flowchart showing a series of processes that shifts from a battery electric vehicle (BEV) traveling mode to an engine traveling mode by setting the K0 clutch to an engagement state.

As shown in FIG. 6, when shifting of the K0 clutch 81 from the disengagement state to the engagement state is required, the controller 10 executes a target rotation speed matching process. The target rotation speed matching process is a process that matches a target engine rotation speed, which is greater than a target motor rotation speed, with the target motor rotation speed. When such clutch shifting is required, the traveling mode is required to be shifted to the engine traveling mode, which transmits force of the engine 91 to the drive wheels 72. The controller 10 shifts the K0 clutch 81 from the disengagement state to the engagement state after the engine rotation speed matches the motor rotation speed. This minimizes changes in the driving force when the K0 clutch is engaged.

Process Executed by Controller 10 when K0 Clutch 81 is in Disengagement State

When the K0 clutch 81 is in the disengagement state, the controller 10 idles the engine 91 in accordance with the target engine rotation speed and operates the motor 82 in accordance with the target motor rotation speed. In other words, the controller 10 controls the engine 91 so that the engine rotation speed matches the target engine rotation speed. The controller 10 further controls the motor 82 so that the motor rotation speed matches the target motor rotation speed.

A process that selects a map specifying the target engine rotation speed and the target motor rotation speed will now be described with reference to FIG. 2. The process of FIG. 2 is repeatedly executed in predetermined cycles.

The controller 10 determines whether a warm-up operation is required in step S200. When a warm-up operation is required (S200: YES), the controller 10 proceeds to step S202. The controller 10 selects the warm-up operation map of FIG. 4 in step S202.

When a warm-up operation is not required (S200: NO), the controller 10 proceeds to step S204. The controller 10 determines whether high temperature restarting is required in step S204. When high temperature restarting is required (step S204: YES), the controller 10 proceeds to step S206. Specifically, the controller 10 determines that high temperature restarting is required if an intake air temperature is higher than or equal to an intake air temperature threshold value and an engine coolant temperature is higher than or equal to a coolant temperature threshold value Th when the engine 91 is started. The controller 10 selects the high temperature restart map of FIG. 5 in step S206. A high temperature restarting process will now be described. Fuel vaporizes if the engine 91 is stopped when the ambient temperature is high. This results in unstable fuel injection that leads to rough idling after the engine 91 is started. The high temperature restarting process raises the target engine rotation speed to increase fuel injection and stabilize combustion.

When high temperature restarting is not required (step S204: NO), the controller 10 proceeds to step S208. The controller 10 selects the normality map of FIG. 3 in step S208.

After selecting a map in step S202, step S206, or step S208, the controller 10 proceeds to step S210. The controller 10 sets the target engine rotation speed and the target motor rotation speed in accordance with the selected map in step S210.

The normality map will now be described with reference to FIG. 3.

Figures 3, 4:
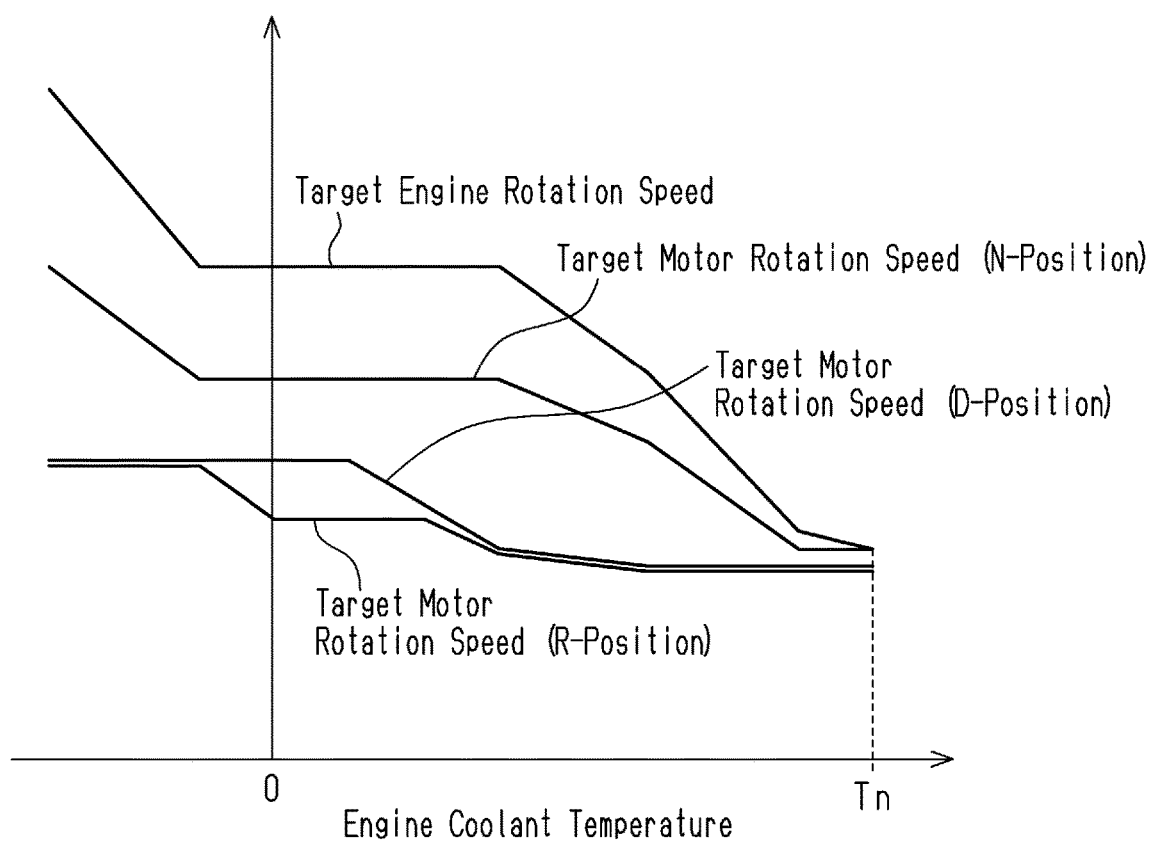
FIG. 3 is a diagram of a normality map.
FIG. 4 is a diagram of a warm-up operation map.

As shown in FIG. 3, the target engine rotation speed is fixed in the normality map irrespective of the gearshift position. In the example shown in FIG. 3, the target engine rotation speed is 800. The fixed target engine rotation speed is set irrespective of the gearshift position for the following reason. The engine 91 is arranged at the upstream side of the motor 82, the torque converter 83, and the automatic transmission 85. The K0 clutch 81 is arranged between the engine 91 and the motor 82. Thus, when the K0 clutch 81 is disengaged, the engine 91 is not affected by the gearshift position. This allows the target rotation speed to be fixed irrespective of the gearshift position when the K0 clutch 81 is in the disengagement state.

As shown in FIG. 3, a target motor rotation speed is set based on the gearshift position in the normality map. In the example shown in FIG. 3, the target motor rotation speed is 650 when the selected gearshift position is the D-position (drive position). The D-position is the gearshift position that is normally selected when the vehicle 90 travels and allows for automatic shifting of gears in accordance with the speed of the vehicle 90. In the example shown in FIG. 3, the target motor rotation speed is 700 when the selected gearshift position is the N-position (neutral position). The N-position is the gearshift position for cutting the transmission of force through gears of the automatic transmission 85. In the example shown in FIG. 3, the target motor rotation speed is 650 when the selected gearshift position is the R-position (reverse position). The R-position is the gearshift position for moving the vehicle 90 rearward. In this manner, when the K0 clutch 81 is in the disengagement state and the engine 91 is idling, the controller 10 sets the target motor rotation speed based on the gearshift position irrespective of the operation state of the engine 91.

As shown in FIG. 3, in the normality map that is used when the K0 clutch 81 is in the disengagement state and the engine 91 is idling, the target motor rotation speed is less than the target engine rotation speed.

The warm-up operation map will now be described with reference to FIG. 4.

As shown in FIG. 4, if the engine 91 is warmed up when the K0 clutch 81 is in the disengagement state, the controller 10 sets a target engine rotation speed based on a warm-up state of the engine 91 irrespective of the gearshift position. The engine coolant temperature is used as a variable for determining the warm-up state. The target engine rotation speed, which is set based on the warm-up state of the engine 91, is higher when the engine coolant temperature is lower.

Further, as shown in FIG. 4, if the engine 91 is warmed up when the K0 clutch 81 is in the disengagement state, the controller 10 sets the target motor rotation speed based on the gearshift position and the warm-up state of the engine 91. The target motor rotation speed, which is set based on the gearshift position and the warm-up state of the engine 91, is higher when the engine coolant temperature is lower. As shown in FIG. 4, a given engine coolant temperature satisfies the relationship of the target motor rotation speed (N-position)>the target motor rotation speed (D-position) ≥the target motor rotation speed (R-position). The target motor rotation speed (D-position) partially coincides with the target motor rotation speed (R-position). That is, in FIG. 4, the target motor rotation speed (D-position) is shown as being slightly separated from the target motor rotation speed (R-position) in some areas for illustrative purposes only.

As shown in FIG. 4, when the engine 91 is idling, the target motor rotation speed is less than the target engine rotation speed except when the target motor rotation speed (N-position) reaches the warm-up completion temperature Tn.

The high temperature restart map will now be described with reference to FIG. 5.

When determining that high temperature restarting is required, the controller 10 executes the high temperature restarting process. The high temperature restarting process includes a process that sets a target engine rotation speed. As shown in FIG. 5, the target engine rotation speed, set in the high temperature restarting process, is higher when the engine coolant temperature is higher.

When the K0 clutch 81 is in the disengagement state and the high temperature restarting process is executed, the controller 10 sets the target motor rotation speed based on the gearshift position and the engine coolant temperature. As shown in FIG. 5, the target motor rotation speed, set in the high temperature restarting process, is higher when the engine coolant temperature is higher. As shown in FIG. 5, a given engine coolant temperature satisfies the relationship of the target motor rotation speed (N-position)>the target motor rotation speed (D-position)=the target motor rotation speed (R-position).

Figure 5:
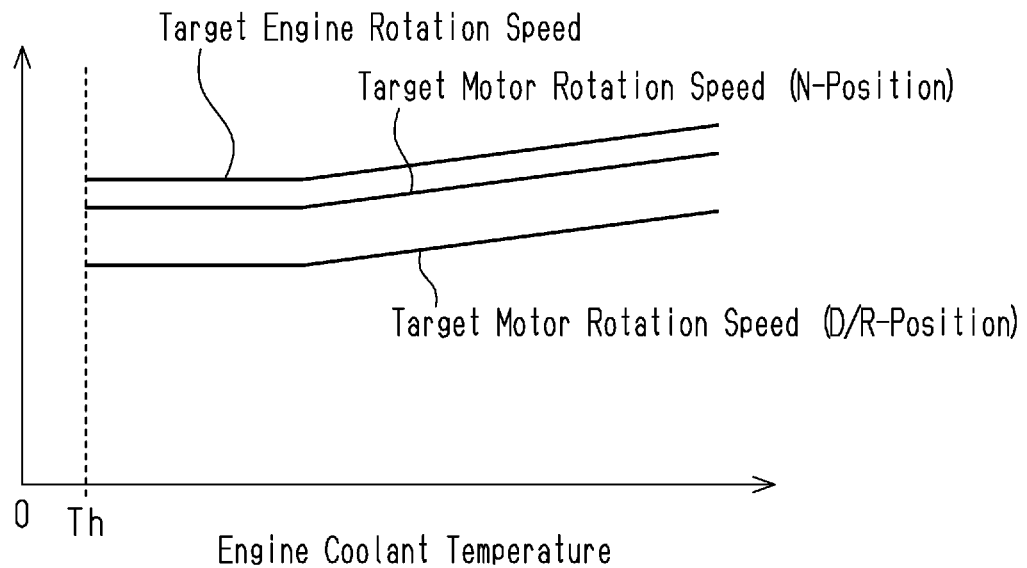
FIG. 5 is a diagram of a high temperature restart map.

As shown in FIG. 5, when the engine 91 is idling, the target motor rotation speed is less than the target engine rotation speed.

Process Executed by Controller 10 when Shifting K0 Clutch 81 from Disengagement State to Engagement State A process executed by the controller 10 when shifting the K0 clutch 81 from the disengagement state to the engagement state will now be described with reference to FIG. 6. When the K0 clutch 81 is required to be shifted from the disengagement state to the engagement state, the controller 10 starts the process of FIG. 6.

In step S600, the controller 10 executes the target rotation speed matching process that matches the target engine rotation speed, which is greater than the target motor rotation speed, with the target motor rotation speed.

In step S602, the controller 10 executes a rotation speed matching waiting process and waits for the engine rotation speed to match the target engine rotation speed.

In step S604, the controller 10 executes a K0 clutch engaging process that controls and shifts the K0 clutch 81 to the engagement state.

In step S606, the controller 10 executes a torque switching process. The torque switching process is a process that changes the distribution of an engine shaft torque and a motor torque while maintaining the sum of the engine shaft torque and the motor torque. The engine shaft torque is the shaft torque of the engine 91, and the motor torque is the output torque of the motor 82.

The controller 10 ends the process when completing step S606.

Operation of Present Embodiment

Figure 7:
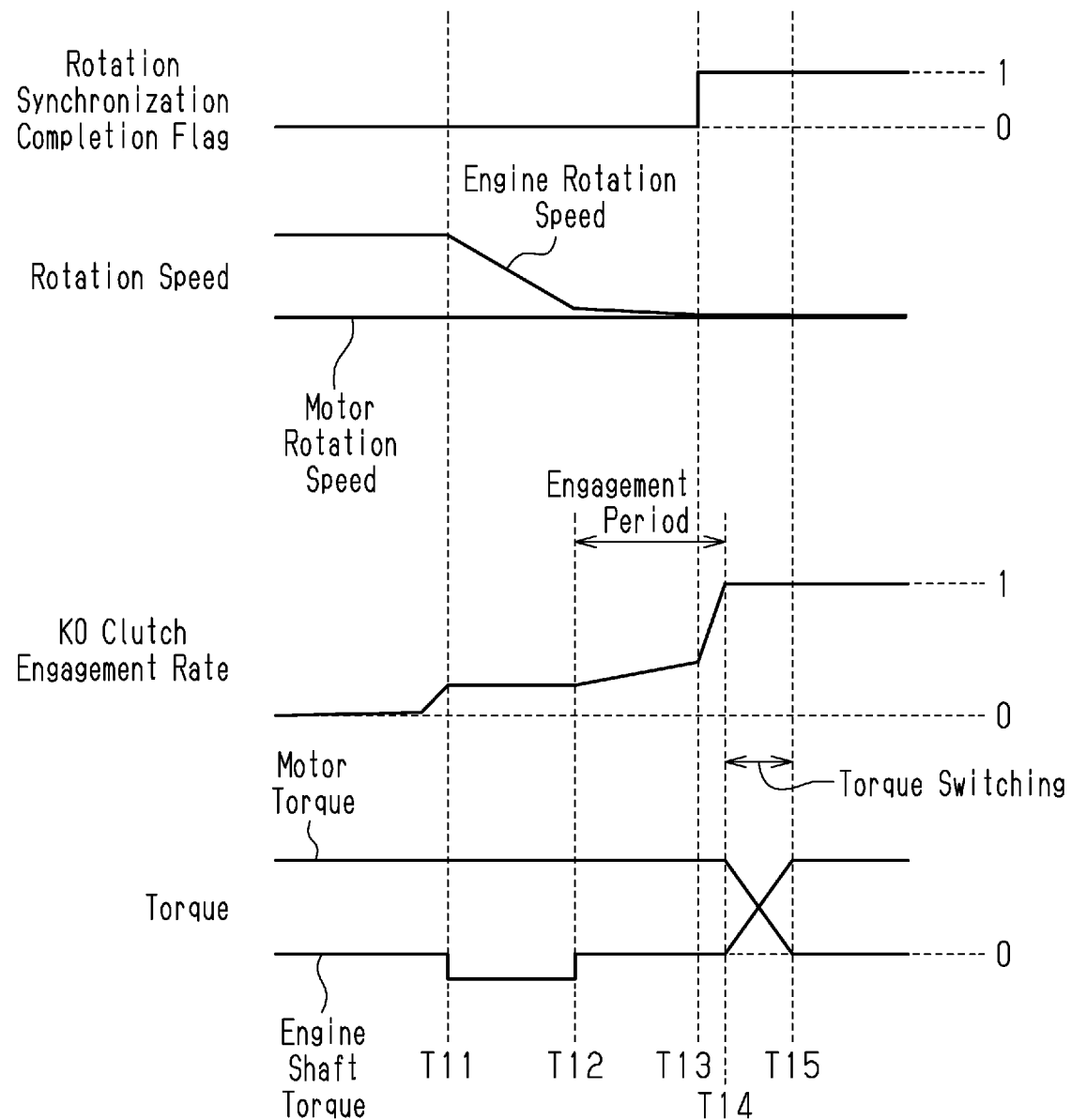
FIG. 7 is a diagram showing the actions that occur when shifting from the BEV traveling mode to the engine traveling mode in a case in which the K0 clutch is in the disengagement state and the normality map is selected.

The operation performed if clutch shifting is required when the engine 91 is idling in accordance with the normality map will now be described with reference to FIG. 7.

First, when the K0 clutch 81 is in the disengagement state, the controller 10 idles the engine 91 in accordance with the target engine rotation speed and operates the motor 82 in accordance with the target motor rotation speed. The target engine rotation speed is greater than the target motor rotation speed. Thus, the engine rotation speed is greater than the motor rotation speed. Since the engine 91 is idling, the engine shaft torque is 0. In contrast, the motor torque is positive.

When clutch shifting is required, the controller 10 slightly raises a K0 clutch engagement rate from the disengagement state of the K0 clutch 81 (i.e., from state in which K0 clutch engagement rate is 0). The engine rotation speed, which is greater than the motor rotation speed, is decreased through the target rotation speed matching process so as to approach the motor rotation speed during the period from time T11 to time T12. The engine shaft torque is negative during the period from time T11 to time T12.

At time T12, the engine rotation speed substantially matches the motor rotation speed. The controller 10 gradually raises the K0 clutch engagement rate during the period from time T12 to time T13. At time T13, the engine rotation speed matches the motor rotation speed. This changes a rotation synchronization flag indicating whether the engine rotation speed matches the motor rotation speed from 0 to 1.

The controller 10 sharply raises the K0 clutch engagement rate to 1 during the period from time T13 to time T14. The period from time T12, at which the engine rotation speed substantially matches the motor rotation speed, to time T14, at which the K0 clutch engagement rate becomes 1, is referred to as the engagement period.

The controller 10 executes the torque switching process during the period from time T14 to time T15. At time T15, the motor torque becomes 0. At time T15, the engine shaft torque becomes equal to the torque that was output by the motor 82 before clutch shifting was required.

The operation performed if clutch shifting is required when the engine 91 is idling in accordance with the warm-up operation map will now be described with reference to FIG. 8. Changes in the engine rotation speed, changes in the motor rotation speed, and changes in the engine shaft torque according to the present embodiment are indicated by solid lines. Changes in the engine rotation speed, changes in the motor rotation speed, and changes in the engine shaft torque according to a comparative example are indicated by long-dash short-dash lines.

First, when the K0 clutch 81 is in the disengagement state, the controller 10 idles the engine 91 in accordance with the target engine rotation speed and operates the motor 82 in accordance with the target motor rotation speed. In this case, the warm-up operation is required. Thus, the target engine rotation speed is set to be higher than the target engine rotation speed of the normality map. Further, the target motor rotation speed is set to be higher than the target motor rotation speed of the normality map. The target motor rotation speed of the comparative example is the target motor rotation speed of the normality map.

The controller 10 matches the engine rotation speed with the motor rotation speed during the period from time T21 to time T23. In the comparative example, the engine rotation speed needs to be decreased by a greater amount than the present embodiment in order to match the engine rotation speed with the target motor rotation speed. In the present embodiment, the target motor rotation speed is set to be relatively high before clutch shifting is required so that a change in the engine rotation speed that decreases is less than the comparative example. In this case, the target motor rotation speed is set so that the warm-up operation of the engine 91 is not adversely affected when the engine rotation speed matches the motor rotation speed.

Figure 8:
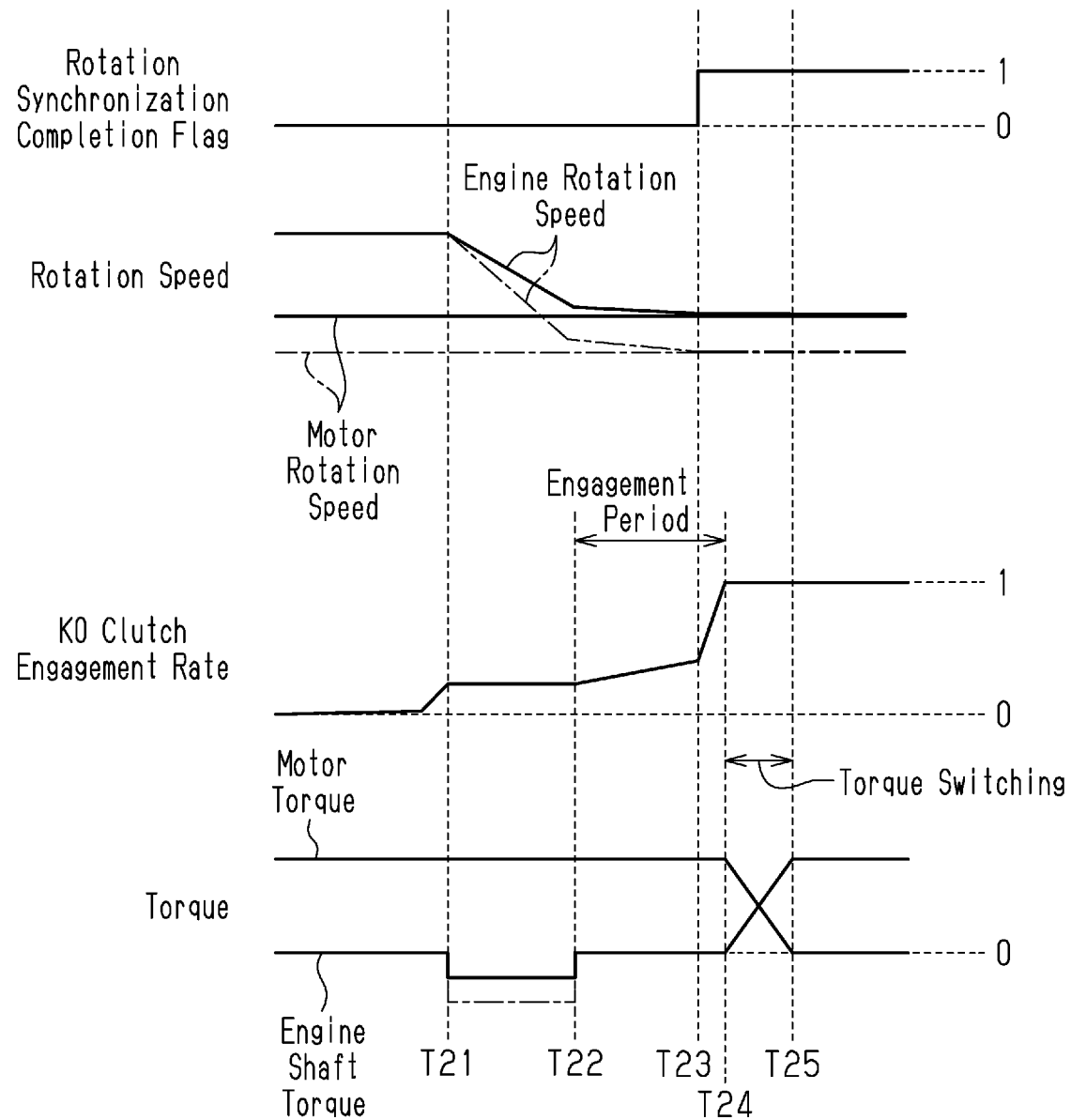
FIG. 8 is a diagram showing the actions that occur when shifting from the BEV traveling mode to the engine traveling mode in a case in which the K0 clutch is in the disengagement state and the warm-up operation map is selected.

The operation performed if clutch shifting is required when the engine 91 is idling in accordance with the high temperature restart map is the same as the operation shown in FIG. 8.

Advantages of the Embodiment (1) When the K0 clutch 81 is in the disengagement state, the controller 10 idles the engine 91 in accordance with the target engine rotation speed and operates the motor 82 in accordance with the target motor rotation speed. The target motor rotation speed is less than the target engine rotation speed. Thus, the motor 82 consumes less power than when the motor 82 is operated in accordance with the target rotation speed that matches the target engine rotation speed.

(2) A change in the motor rotation speed changes the driving force. When clutch shifting is required, the target engine rotation speed is matched with the target motor rotation speed. In other words, the engine rotation speed is matched with the motor rotation speed without changing the motor rotation speed. This minimizes changes in the driving force when the K0 clutch is engaged.

(3) When the K0 clutch 81 is in the disengagement state, the motor 82 is not affected by the engine 91. Thus, the target motor rotation speed can be set freely based on the gearshift position.

(4) When the K0 clutch 81 is in the disengagement state, the engine 91 is not affected by the motor 82. Thus, when the K0 clutch 81 is in the disengagement state, the target engine rotation speed can be set freely based on the warm-up state of the engine 91.

(5) When the engine coolant temperature is relatively low, the rotation speed of the engine 91 is increased to warm the engine 91. With the above structure, the target engine rotation speed is higher when the engine coolant temperature is lower. This warms the engine 91 in an appropriate manner.

(6) Clutch shifting may be required when the K0 clutch 81 is in the disengagement state and the engine 91 is performing a warm-up operation. With the above structure, the target motor rotation speed is increased in advance following the target engine rotation speed. Then, the target engine rotation speed is matched with the target motor rotation speed. Afterwards, the K0 clutch 81 is controlled and shifted to the engagement state. In the comparative example, when the target engine rotation speed is matched with the target motor rotation speed, the target motor rotation speed is not increased following the target engine rotation speed. With the above structure of the present embodiment, the change in the engine rotation speed when clutch shifting is required is less than the comparative example. Thus, with the above structure, warming of the engine 91 is less interrupted than the comparative example. Changes in the driving force are minimized when the K0 clutch 81 is engaged by controlling and shifting the K0 clutch 81 to the engagement state after matching the engine rotation speed with the motor rotation speed.

(7) Fuel vaporizes if the engine 91 is stopped when the ambient temperature is high. This results in unstable fuel injection that leads to rough idling after the engine 91 is started. With the above structure, the controller 10 assumes that rough idling will occur when the intake air temperature is higher than or equal to the intake air temperature threshold value and the engine coolant temperature is higher than or equal to the coolant temperature threshold value Th.

When the engine coolant temperature is relatively high, a fuel pipe may be hot. Thus, fuel vaporization is more likely to occur as the engine coolant temperature becomes higher. With the above structure, the target engine rotation speed is higher when the engine coolant temperature is higher. The increased target engine rotation speed increases fuel injection and stabilizes combustion.

(8) Clutch shifting may be required during the high temperature restarting process when the K0 clutch 81 is in the disengagement state. With the above structure, the target motor rotation speed is increased in advance following the target engine rotation speed. Then, the target engine rotation speed is matched with the target motor rotation speed. Afterwards, the K0 clutch 81 is controlled and shifted to the engagement state. In the comparative example, the target engine rotation speed is matched with the target motor rotation speed without increasing the target motor rotation speed in a manner following the target engine rotation speed. With the above structure of the present embodiment, the change in the engine rotation speed when clutch shifting is required is less than the comparative example. Thus, with the above structure, the high temperature restarting process is less interrupted than the comparative example. Changes in the driving force when the K0 clutch 81 is engaged are minimized by controlling and shifting the K0 clutch 81 to the engagement state after matching the engine rotation speed with the motor rotation speed.

Modifications

The present embodiment may be modified as described below. The present embodiment and the following modifications can be combined as long as the combined modifications remain technically consistent with each other.

In the above embodiment, when the K0 clutch 81 is in the disengagement state, the controller 10 selects the normality map, the warm-up operation map, or the high temperature restart map. However, this is only an example. When the K0 clutch 81 is in the disengagement state and the engine 91 is idling, the target motor rotation speed only needs to be less than the target engine rotation speed.

The target engine rotation speed and the target motor rotation speed shown in FIG. 3 in the above embodiment are only an example. For example, the target motor rotation speeds (D-position/R-position) may be 650 and the target engine rotation speed may be 700, which is the same as the target motor rotation speed (N-position). In this case, for example, when the selected gearshift position is the D-position and the engine 91 is idling, the target motor rotation speed is less than the target engine rotation speed. This case has the same advantage as advantage (1) described above.

In the above embodiment, the target engine rotation speed that is set based on the warm-up state of the engine 91 is higher when the engine coolant temperature is lower. However, this is only an example. For example, the target engine rotation speed when warming is required may be a fixed value that is higher than the target engine rotation speed when the warming is not required.

In the above embodiment, the target engine rotation speed that is set based on the warm-up state of the engine 91 is higher when the engine coolant temperature is lower. The warm-up operation map shown in FIG. 4 is only an example. For example, the target engine rotation speed may change in stages in accordance with the engine coolant temperature.

In the above embodiment, the target motor rotation speed that is set based on the gearshift position and the warm-up state of the engine 91 is higher when the engine coolant temperature is lower. The warm-up operation map shown in FIG. 4 is only an example. For example, the target motor rotation speed may change in stages in accordance with the engine coolant temperature.

In the above embodiment, the target engine rotation speed that is set in the high temperature restarting process is higher when the engine coolant temperature is higher. The high temperature restart map shown in FIG. 5 is only an example. For example, the target engine rotation speed may change in stages in accordance with the engine coolant temperature.

In the above embodiment, the target motor rotation speed that is set in the high temperature restarting process is higher when the engine coolant temperature is higher. The high temperature restart map shown in FIG. 5 is only an example. For example, the target motor rotation speed may change in stages in accordance with the engine coolant temperature.

In the above-described embodiment, the controller 10 includes a CPU, ROM, and RAM and executes software processing. However, this is only an example. For example, the controller 10 may include a dedicated hardware circuit (such as ASIC) that executes at least part of the software processes executed in the above embodiment. That is, the controller 10 may be modified to have any one of the following configurations (a) to (c). (a) The controller 10 includes a processor that executes all processes according to programs and a program storage device such as ROM that stores the programs. That is, the controller 10 includes a software execution device. (a) The controller 10 includes a processor that executes part of processes according to programs and a program storage device. The controller 10 further includes a dedicated hardware circuit that executes the other processes. (c) The controller 10 includes a dedicated hardware circuit that executes all processes. A plurality of software execution devices and/or a plurality of dedicated hardware circuits may be provided. In other words, the above processes may be executed by processing circuitry that includes at least one of a software executing device and a dedicated hardware circuit. A plurality of software execution devices and a plurality of dedicated hardware circuits may be included in the processing circuitry. The program storage device, or computer readable media, includes any type of media that are accessible by general-purpose computers and dedicated computers.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for a hybrid electric vehicle, wherein the hybrid electric vehicle includes an engine, a motor arranged in a power transmission path between the engine and a drive wheel, and a clutch arranged in the power transmission path between the engine and the motor, the controller comprising:
    processing circuitry, wherein
    the processing circuitry is configured to idle the engine in accordance with a target engine rotation speed and operate the motor in accordance with a target motor rotation speed when the clutch is in a disengagement state,
    when the clutch is in the disengagement state and the engine is idling, the target motor rotation speed is less than the target engine rotation speed,
    when the clutch is in the disengagement state and the engine is performing a warm-up operation, the processing circuitry is configured to set the target engine rotation speed based on a warm-up state of the engine irrespective of a gearshift position,
    the target engine rotation speed that is set based on the warm-up state of the engine is higher when an engine coolant temperature is lower,
    when the clutch is in the disengagement state and the engine is performing the warm-up operation, the processing circuitry is configured to set the target motor rotation speed based on the gearshift position and the warm-up state of the engine,
    the target motor rotation speed that is set based on the gearshift position and the warm-up state of the engine is higher when the engine coolant temperature is lower,
    if the clutch is to be shifted to an engagement state when the clutch is in the disengagement state and the engine is performing the warm-up operation, the processing circuitry is configured to execute:
        a process that matches the target engine rotation speed that is greater than the target motor rotation speed with the target motor rotation speed;
        a process that waits for an engine rotation speed to match the target engine rotation speed; and
        a process that controls and shifts the clutch to the engagement state.

2. The controller according to claim 1, wherein when the clutch is to be shifted from the disengagement state to an engagement state, the processing circuitry is configured to execute:
    a process that matches the target engine rotation speed that is greater than the target motor rotation speed with the target motor rotation speed;
    a process that waits for an engine rotation speed to match the target engine rotation speed; and
    a process that controls and shifts the clutch to the engagement state.

3. The controller according to claim 1, wherein when the clutch is in the disengagement state and the engine is idling, the processing circuitry is configured to set the target motor rotation speed based on a gearshift position irrespective of an operation state of the engine.

4. A controller for a hybrid electric vehicle, wherein the hybrid electric vehicle includes an engine, a motor arranged in a power transmission path between the engine and a drive wheel, and a clutch arranged in the power transmission path between the engine and the motor, the controller comprising:
    processing circuitry, wherein
    the processing circuitry is configured to idle the engine in accordance with a target engine rotation speed and operate the motor in accordance with a target motor rotation speed when the clutch is in a disengagement state,
    when the clutch is in the disengagement state and the engine is idling, the target motor rotation speed is less than the target engine rotation speed,
    the processing circuitry is configured to execute a high temperature restarting process if an intake air temperature is higher than or equal to an intake air temperature threshold value and an engine coolant temperature is higher than or equal to a coolant temperature threshold value when the engine is started,
    the high temperature restarting process includes setting the target engine rotation speed, and
    the target engine rotation speed that is set in the high temperature restarting process is higher when the engine coolant temperature is higher.

5. The controller according to claim 4, wherein when the clutch is in the disengagement state and the high temperature restarting process is executed, the processing circuitry is configured to set the target motor rotation speed based on a gearshift position and the engine coolant temperature,
    the target motor rotation speed that is set in the high temperature restarting process is higher when the engine coolant temperature is higher,
    if the clutch is to be shifted to an engagement state when the clutch is in the disengagement state and the high temperature restarting process is being executed, the processing circuitry is configured to execute:
    a process that matches the target engine rotation speed that is greater than the target motor rotation speed with the target motor rotation speed;
    a process that waits for an engine rotation speed to match the target engine rotation speed; and
    a process that controls and shifts the clutch to the engagement state.

* * * * *